(12) United States Patent
Beck et al.

(10) Patent No.: US 6,587,832 B1
(45) Date of Patent: Jul. 1, 2003

(54) MARKET PAY SYSTEM

(75) Inventors: David Beck, Montara, CA (US); Alexander Dukhovny, San Francisco, CA (US); David Meredith, El Sobrante, CA (US); David Ellis, San Francisco, CA (US)

(73) Assignee: Compensate.com LLC, Montara, CA (US)

( * ) Notice: Subject to any disclaimer, the term of this patent is extended or adjusted under 35 U.S.C. 154(b) by 0 days.

(21) Appl. No.: 09/527,081

(22) Filed: Mar. 16, 2000

(51) Int. Cl.[7] .............................................. G06F 17/60
(52) U.S. Cl. ................................. 705/9; 705/8; 705/10
(58) Field of Search ............................................. 705/9

(56) References Cited

U.S. PATENT DOCUMENTS

| | | | | |
|---|---|---|---|---|
| 4,908,758 A | * | 3/1990 | Sanders ........................ 434/323 |
| 5,117,353 A | * | 5/1992 | Stipanovich et al. .......... 705/11 |
| 5,416,694 A | * | 5/1995 | Parrish et al. .................. 705/8 |
| 5,963,911 A | * | 10/1999 | Walker et al. .................. 705/7 |
| 6,049,776 A | * | 4/2000 | Donnelly et al. ............... 705/8 |

FOREIGN PATENT DOCUMENTS

GB          2191025 A  * 12/1987  .......... G06F/15/21

OTHER PUBLICATIONS

The Fact Book (1998). http://www.opm.gov/feddata/factbook/1998/98fb–00.htm. Retreived Jun. 18, 2002 [online].*
McClave, james T. "A First Course in Business Statistics" 1983 Dellen Publishing Co. Santa Clara. pp 395–434.*

* cited by examiner

Primary Examiner—James P. Trammell
Assistant Examiner—James A. Reagan
(74) Attorney, Agent, or Firm—John F. Schipper (57) ABSTRACT

Method and system for obtaining and using observed market rates in estimating suitable market-based compensation for one or more jobs. Each observed market rate is assigned a job family and a combination of a job category and a job level of responsibility (C/L). Median market rates and average market rates are observed for different job families and are combined in a novel way to produce job family factors and C/L factors that, when multiplied together accurately reflect market rates for that job, even for a combination of job family and job C/L that is not represented in the data.

16 Claims, 6 Drawing Sheets

EMPLOYEE EVALUATION

Enter the following employee information. For help in entering data in a blue field whose name is italics, click on that field's name. The red fields are automatically calculated.

Employee Name: Joe Sample

| Department | Dept. No. | Position Title |
|---|---|---|
| Human Resources | 1001 | Compensation Manager |

| ID Job Family | Job Category | level | performance |
|---|---|---|---|
| 0979 Compensation | Professional | 1 | Meets |

Default: No   Select "Yes" if no market rates are predicted for the job category selected.

Market Reference Points (MRPs) for Selected Labor Market

S.F. Bay Area

| Pay Type | 10%tile | 25%tile | 50%tile | 75%tile | 90%tile |
|---|---|---|---|---|---|
| Base Pay | 33,415 | 36,767 | 41,283 | 43,642 | 47,380 |

| Range Spread | Salary Range | | | | |
|---|---|---|---|---|---|
| | Minimum | Q2 | MRP | Q3 | Maximum |
| 50.0% | 33,707 | 37,303 | 41,283 | 45,687 | 50,561 |

| | | Salary Plan | | | |
|---|---|---|---|---|---|
| Salary | Begin Q | Increase | Amount | New Q | New Salary |
| 40,000 | 2 | 3.5% | 1,400 | 3 | 41,400 |

*Fig. 3*

ACCOUNTING

| Pay Type | Base |
|---|---|
| Labor Market | S.F. Bay Area |
| Adjusted Location | None |
| Analysis Date | 02/02/00 |
| Effective Date | 02/02/00 |
| Annual Aging Factor | 4% |

MARKET PAY RATES

| Responsibility Level | 10%ile | 25%ile | 50%ile | 75%ile | 90%ile |
|---|---|---|---|---|---|
| SUPPORT ||||||
| ENTRY LEVEL | 20,572 | 24,139 | 27,544 | 31,842 | 33,284 |
| INTERMEDIATE | 26,054 | 29,046 | 32,957 | 36,607 | 33,284 |
| ADVANCED | 31,932 | 34,779 | 38,470 | 42,048 | 47,166 |
| SENIOR | 36,064 | 40,603 | 44,498 | 48,239 | 54,116 |
| LEAD | 49,040 | 52,945 | 57,420 | 61,719 | 66,602 |

*Fig. 5A*

| PROFESSIONAL | | | | | |
|---|---|---|---|---|---|
| ENTRY LEVEL | 39,962 | 43,243 | 47,819 | 52,694 | 56,739 |
| INTERMEDIATE | 46,045 | 50,221 | 55,472 | 62,177 | 68,384 |
| SEASONED | 55,538 | 62,198 | 69,632 | 77,613 | 84,867 |
| SPECIALIST | 70,595 | 77,768 | 84,413 | 93,320 | 101,810 |
| EXPERT | 86,202 | 94,575 | 102,505 | 111,992 | 120,238 |
| AUTHORITY | 103,523 | 111,433 | 123,009 | 138,971 | 150,071 |
| 7th LEVEL | 106,074 | 120,134 | 148,534 | 177,036 | 198,875 |
| MANAGEMENT | | | | | |
| SUPERVISOR | 41,255 | 48,892 | 53,505 | 59,527 | 65,566 |
| Supervisor/Manager | 57,423 | 63,807 | 71,312 | 78,820 | 87,060 |
| MANAGER | 72,798 | 80,754 | 89,779 | 100,282 | 111,442 |
| Manager/Director | 89,617 | 97,449 | 108,873 | 119,286 | 129,305 |
| DIRECTOR | 102,577 | 113,771 | 126,974 | 140,540 | 155,937 |
| Director/Sr. Director | 117,189 | 129,199 | 150,493 | 171,958 | 190,787 |
| EXECUTIVE | | | | | |
| Sr. Director/VP | 126,057 | 146,683 | 167,638 | 217,405 | 271,146 |
| VP | 139,524 | 170,882 | 201,675 | 239,583 | 285,123 |
| VP/SVP | 188,716 | 215,236 | 267,838 | 311,066 | 457,402 |
| SVP/COO | 230,247 | 285,144 | 326,619 | 374,683 | 444,462 |
| CEO | 311,066 | 388,885 | 492,522 | 622.133 | 684,346 |

*Fig. 5B*

MARKET PAY SYSTEM

FIELD OF THE INVENTION

This invention relates to a systematic determination of an employee's market value within different job families and levels of responsibility.

BACKGROUND OF THE INVENTION

Wherever one person or organization hires one or more workers to perform certain tasks, one issue that must be addressed is the proper level of compensation for the employee(s). Where only one employee is hired, the employer is theoretically free to compensate the employee at an arbitrary level, consistent with applicable minimum wage laws and the presumed goal of the employer to survive and/or to make a reasonable profit. However, as soon as an employer employs two or more employees to perform different tasks, proper compensation of each employee relative to the other employee(s) becomes a central concern. Further, an employer with one or more employees will wish to compensate each employee at a market rate sufficient to retain each employee, but not so generously as to put the employer at a competitive disadvantage. An employee job family and job level of responsibility, as discussed in the following, are found to be highly correlated with an employee's market rate.

What is needed is an automated system for determining a group of employees' market value, based upon their job families and respective levels of responsibility. Preferably, the system should be flexible enough to work with arbitrarily few, or arbitrarily many, combinations of job families and levels of responsibility. Preferably, the system should allow automated data processing using a computer but should not require a supercomputer for the analysis or presentation of the results. Preferably, the system should perform its analysis reasonably quickly, should be expandable to analyze an arbitrary number of observations (market rates) and should be able to estimate or allow predication of market value for at least one combination not included in the observations.

SUMMARY OF THE INVENTION

These needs are met by the invention, which provides a system that receives an arbitrary number of observations (market rates) for different job families and levels of responsibility and returns an estimate of the appropriate market values within a specified labor market for any combination of job family and level of responsibility within the system. These market values can then be compared to the internal salaries of employees, and appropriate salary adjustments can be devised.

The observations (market rates) are classified into job families and levels of responsibility. For clarification purposes, levels of responsibility are divided into categories in this application, and each is referred to as category/level of responsibility, or simply C/L. An algorithm, believed to be nearly optimal, is applied to the observations to identify a market value estimate for each of a selected number of job families and C/Ls. The algorithm produces a factor for each job family and for each level of responsibility in the system. By multiplying the factor of the job family by the factor for the C/L, it is possible to estimate the market value for any combination of job family and C/L within the system.

Where a market rate for a specified job cannot be directly estimated, because the particular combination of that job family and C/L factor is not found among the market rates, the market value for the specified job family can be estimated indirectly, using the appropriate job family factor for a first job family and the appropriate C/L factor for a second job family, where the first and second job families are within the observations. Thus, an estimated market value can be "filled in" where direct market rates are missing.

DESCRIPTION OF BEST MODE OF THE INVENTION

Assume that a model has been set up in which job families, categories, and levels of responsibility have been identified for an organization. The elements in this model would be based on an assessment of the internal needs of the organization and the labor markets in which the organization competes for talent. Assume also that the organization participates in a number of salary surveys that provide information on salaries paid by other companies within their competitive labor markets. The data within these salary surveys provide the observation used by the invention.

For any given set of salary observations, let the job family be indexed by i, which ranges from 1 to n. Define the rank of a position or job as a combination of category and level of responsibility, and let the rank from the set of salary observations be indexed by j, which ranges from 1 to m:

job family: i=1, . . . , n rank (category+level of responsibility): j=1, . . . , m The set of observations is reduced to a set of "median observations" or "data points" as follows. All observations that correspond to a single job family (i) and a single rank (j) are referred to as a "data point." The "salary" corresponding to this data point is the median salary of all observations for job family i and rank j. A "salary", as used herein, is the logarithm of a real salary.

Assuming that there are p data points, two matrices $J=(J_{ki})$ and $R=(R_{kj})$ are constructed, each having as many rows as data points. The matrix J has one column corresponding to each job family, and the matrix R has one column corresponding to each rank. Thus the matrices J and R have the dimensions p-by-n and p-by-m, respectively. For each data point, the corresponding row of the matrix J contains an entry 1 in the column for the corresponding job family and contains zero entries elsewhere in that row. For each data point, the corresponding row of the matrix R contains an entry 1 in the column for the rank and contains zero entries elsewhere in that column. Thus, $J_{ki}=1$ if and only if job family i is observed in data point k; otherwise, $J_{ki}=0$;

$R_{kj}=1$ if and only if rank j is observed in data point k; otherwise, $R_{kj}=0$;

($1 \leq k \leq p$; $1 \leq i \leq n$; $1 \leq j \leq m$).

A column vector S is constructed containing the observed median salaries, one for each data point. The main problem consists of finding columns of logarithmic job family factors $X=(x_1, x_2, \ldots, x_n)^{tr}$ and logarithmic rank factors $Y=(y_1, y_2, \ldots, y_m)^{tr}$ that satisfy the linear relations $$[J \quad R]\begin{bmatrix} X \\ Y \end{bmatrix} = S \quad (1)$$

Solving this system of linear relations by a least squares method leads to ambiguities in the solution variables (X,Y). For example, a constant value could be added to each value $x_i$ and subtracted from each value $y_j$ and the resulting solution would just as acceptable. Moreover, if the data lie in disconnected subsets, additional degrees of freedom are introduced into a least squares solution. One method of eliminating the indeterminacy in the problem is to introduce additional conditions. The additional conditions chosen here are as follows. Not only should each salary be predicted by a linear combination of its job family factor and rank factor, but salaries should be roughly predicted by rank factors alone. That is, if D is a column matrix with one entry for each rank, and if $D_j$ is the average salary or the median salary for the rank j ($1 \leq j \leq m$), the system of linear relations in Eq. (1) is replaced by another linear system, to be solved in a least squares sense:

$$\begin{bmatrix} J & R \\ 0 & I \end{bmatrix}\begin{bmatrix} X \\ Y \end{bmatrix} = \begin{bmatrix} S \\ D \end{bmatrix} \quad (2)$$

where the matrix having the entries J, R, O and I is called the coefficient matrix.

The system of relations in Eq. (2) is now reduced to a non-singular linear system, by pre-multiplying the matrix relation (2) by the transpose of the coefficient matrix to obtain $$\begin{bmatrix} N & T \\ T & M+I \end{bmatrix}\begin{bmatrix} X \\ Y \end{bmatrix} = \begin{bmatrix} S1 \\ S2+D \end{bmatrix} \quad (3)$$

where $N=J^{tr}J$, $M=R^{tr}R$, $T=J^{tr}R$, $S1=J^{tr}S$ and $S2=R^{tr}S$. The matrices $N=(N_{ii'})$, $M=(M_{jj'})$, $T=(T_{ij})$, $S1=(S1_i)$ and $S2=(S2_j)$ are described in more detail in the following.

$$N_{ii'} = \sum_k J_{ki}J_{ki'} = 0,$$

for $i \neq i'$, because each data point has only one associated job family;

$$N_{ii} = \sum_k J_{ki}J_{ki} =$$

number of different job ranks observed for job family i;

$$M_{jj'} = \sum_k J_{kj}J_{kj'} = 0$$

for $j \neq j'$, because each data point has only one associated rank;

$$M_{jj} = \sum_k J_{kj}J_{kj} =$$

number of different job families observed for job rank j;
$T_{ij}=1$ if and only if job family i and rank j are observed together; otherwise, $T_{ij}=0$;

$$S1_i = \sum_k J_{ki}S_k$$

is the sum of salaries observed for job family i; and $$S2_j = \sum_k R_{kj}S_k$$

is the sum of salaries observed for rank j.

The diagonal entries of N (all positive) are the row sums of T; and the diagonal entries of M are the column sums of T.

The system of linear relations in Eq. (3) is row-reduced by pre-multiplication by another matrix.

$$\begin{bmatrix} I & 0 \\ -T^{tr}N^{-1} & I \end{bmatrix}\begin{bmatrix} N & T \\ T & M+I \end{bmatrix}\begin{bmatrix} X \\ Y \end{bmatrix} = \begin{bmatrix} N & T \\ 0 & M+I-T^{tr}N^{-1}T \end{bmatrix}\begin{bmatrix} X \\ Y \end{bmatrix} \quad (4)$$

$$= \begin{bmatrix} S1 \\ S2+D-T^{tr}N^{-1}S1 \end{bmatrix}$$

Because N is a diagonal matrix, its inverse is easy to find. The only real computational work confronted is solution of the non-singular linear system $$[M+I-T^{tr}N^{-1}T][Y]=[S2+D-T^{tr}N^{-1}S1]. \quad (5)$$

The size of the square matrix $[M+I-T^{tr}N^{-1}T]$ is the number of different ranks, at most m. The solution for the much larger matrix X is then found from Eqs. (4) and (5):

$$[N][X]=[S1]-[T][Y]. \quad (6)$$

Once the job family factors $X=(x_1,x_2,\ldots,x_n)^{tr}$ and $Y=(y_1,y_2,\ldots,y_m)^{tr}$ are found, these are most conveniently reported as multiplicative factors. That is, the job family factors are converted from logarithmic form to normal form ("JobFactor") using the transformation $$\text{JobFactor}_i=\exp\{x_i\}; \quad (7)$$

and the rank factors are converted from logarithmic form to normal form ("RankSalary") using the transformation $$\text{RankSalary}_j=\exp\{y_j\}. \quad (8)$$

The MRP real salary for a job or position having job family i and rank j is then determined by $$\{\text{real salary}\}_{i,j}=\{\text{JobFactor}_i\}\cdot\{\text{RankSalary}_j\}. \quad (9)$$

If the job family is unknown, or is not already part of the database, but the RankSalary is known, the MRP real salary is determined primarily from the RankSalary$_j$.

Figure 1:
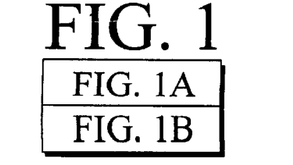
FIGS. 1 and 2 are flow charts illustrating procedures for practicing the invention.
Figure 1A:
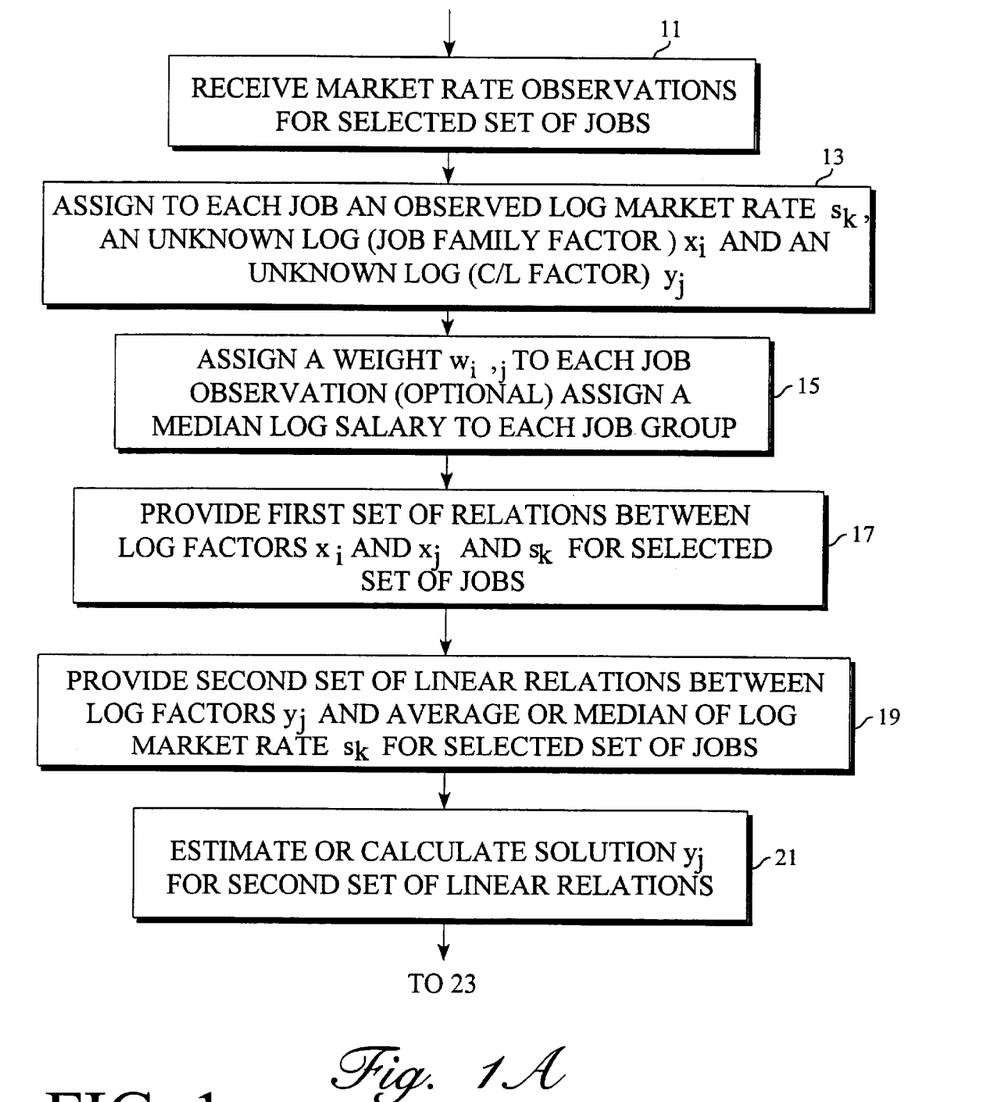
Figure 1B:
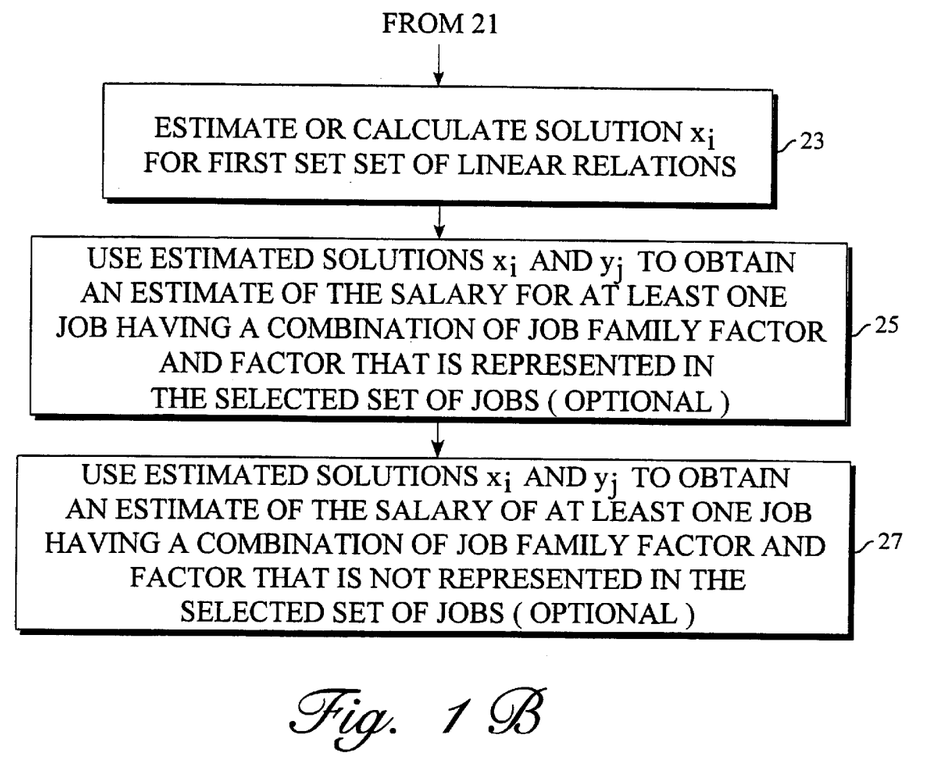

FIG. 1 is a flow chart illustrating a procedure for obtaining and using job family and C/L factors to estimate suitable market values for a selected set of jobs. In step 11, the system receives market rates for a selected set of jobs. In step 13, the data are sorted and combined into data points by assignment to each observed job family of an observed log(salary) $s_k$, an unknown log(job family factor) $x_i$, and an unknown log(C/L factor) $y_j$. In step 15, each job observation is assigned a weight $w_{i,j}$ (optional) and is assigned a (weighted) average or median log(market rate) for the group to which the job data point is assigned.

In step 17, the data points are used to provide a first set of linear relations, represented by matrix relationships in Eqs. (4)–(6)), between the log(C/L factors), log(job family factors) and observed log(market rates). In step 19, The data points are used to provide a second set of linear relations between the log(C/L factors) and either average log(market rates) or median log(market rates) for each observed C/L combination. In step 21, the second set of linear relations is used to estimate or calculate the log(C/L factors). $y_j$. In step 23, the first set of linear relations, plus the solutions $y_j$, are used to estimate or calculate the log(job family factors) $x_i$. In step 25 (optional), the factors are used to calculate an estimated market value or log(market rate) for a job family and C/L factor combination that is represented by at least one observed job in the selected set of jobs, using Eqs. (7) and (8) or some other suitable relation that converts log(job family factor) and log(C/L factor) to an estimated market value. In step 27 (optional), the factors are used to calculate an estimated market value for a job family factor and C/L factor combination that is not represented by an observed job or set of jobs, using Eqs. (7) and (8) or some other suitable relation that converts log(job family factor) and log(C/L factor) to an estimated market value.

The average market rate for each C/L combination (j) used in the matrix D in Eq. (2) can be defined in several ways. The average market rate $S_{avg,j}$ used for a given job rank may be a weighted arithmetic average, which is defined by $$S_{avg,j} = \sum_{i=1}^{n} w_{i,j} \exp\{s_{k(i,j)}\}/n(j), \tag{10}$$

$$CP(i, j) \neq 0$$

$$CP(i, j) = \sum_{k} J_{ki} R_{kj}, \tag{11}$$

where $n(j)$ is the number of market rate observations that have C/L combination j and the numbers $w_{i,j}$ are non-negative weighting coefficients satisfying a normalization condition, such as $$\sum_{i=1}^{n} w_{i,j} = 1. \tag{12}$$

$$CP(i, j) \neq 0$$

In particular, the weighting coefficients $w_{i,j}$ may all have the same (positive) value, such as the inverse of the number of jobs with C/L index j. If the entries for the matrices J and R are all zero or one, the quantity $n(j)$ in Eq. (10) may be defined as $$n(j) = \sum_{i=1}^{n} CP(i, j). \tag{13}$$

the average market rate $S_{avg,j}$ for each C/L combination (j) used in the matrix D may also be a weighted geometric average, defined by $$S_{avg,j} = \exp\left\{\sum_{i=1}^{n} w_{i,j} s_{k(i,j)}/n(j)\right\}, \tag{14}$$

$$CP(i, j) \neq 0$$

where the numbers $w_{i,j}$ are again weighting coefficients satisfying a normalization condition, such as Eq. (12) and $s_k(i,j)$ is an observed log(market rate) data point corresponding to job family i and to C/L j. Again, the weighting coefficients $w_{i,j}$ may all have the same (positive) value.

If desired, an average market rate $S_{avg}$, obtained by summing $S_{avg,j}$ over all C/L indices (j) that occur in the selected set of jobs, can also be computed.

Because the logarithm function is strictly monotonic, the median market rate and the median of the log(market rates) will correspond to the same ordering of market rate observations for a given job indicium, such as C/L.

The data accumulated in the basic set and used to determine the values of the log factors $x_i$ and $y_j$ may not include all combinations of job family and job rank. If a market rate is to be estimated for a particular combination (i,j) of job family and job rank that is not included in the basic set, an estimate for that market rate may be obtained by interpolation. Proceeding in this manner, the invention extends to provision of a market value for a job or job group that was not represented in the original or basic set of salary observations, using Eq. (9) or another suitable conversion equation.

Where several market rate observations are available for a given job family and C/L pair (i,j), the system optionally uses a median value, or the arithmetic average or geometric average of two central median values, as the market rate for that pair. This approach reduces the effect of statistical outliers on the market observations used for that job family and C/L pair.

An alternative approach, where multiple market observations are available for a given job family and C/L pair (i,j), weights each of these observations according to the number of observations that occur for a given pair (i,j). For example, each job observed could be assigned a weight equal to $\{H(i,j)\}^{-1}$, where $H(i,j)$ (assumed≠0) is the number of market observations in the basic set with job family and C/L pair (i,j); this approach weights each job family and C/L pair equally, rather than weighting each observed job equally. Other choices for weighting can also be used here.

Figure 2:
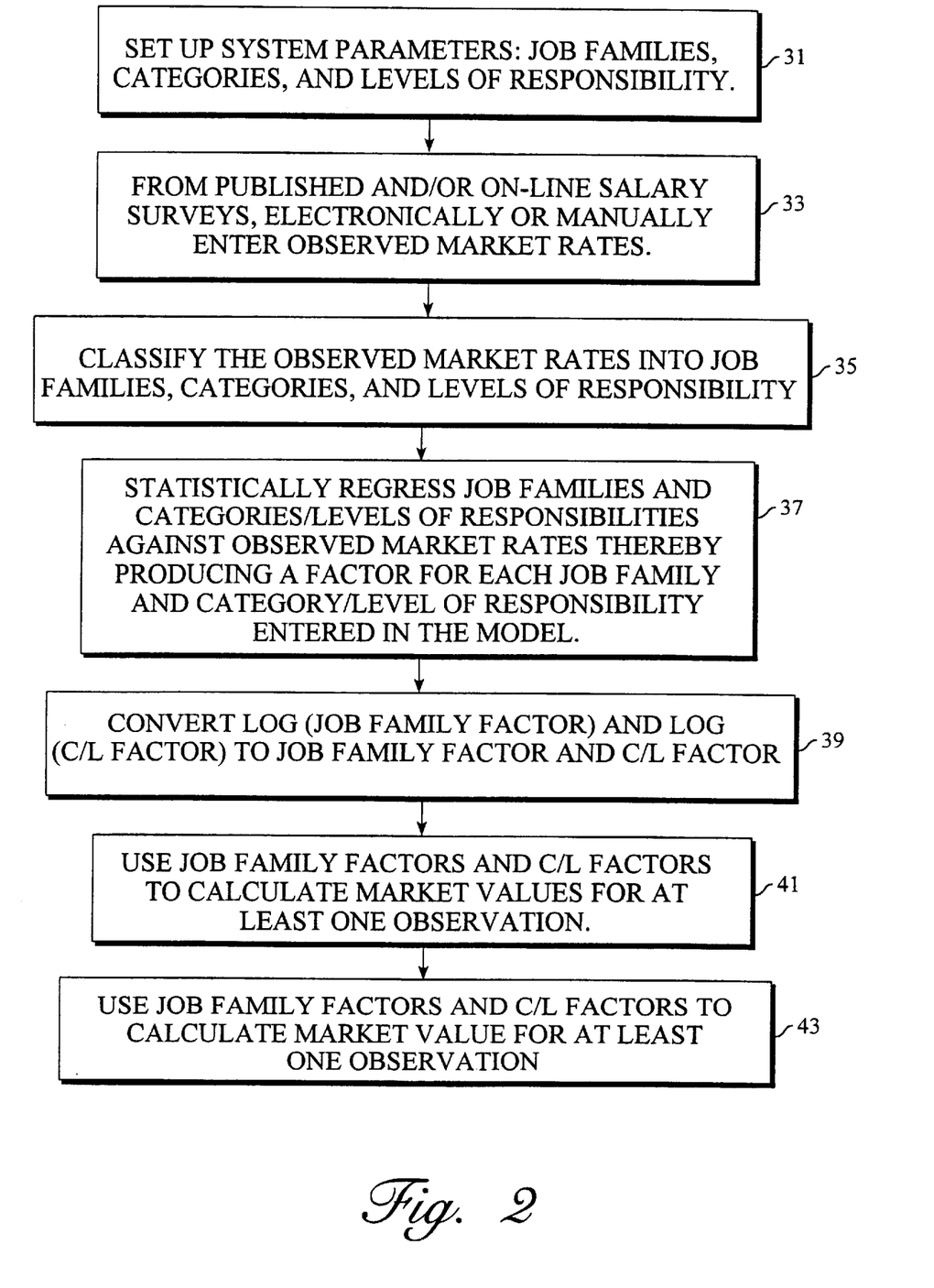

FIG. 2 is a flow chart of a computer-implemented method for determining market rates for a plurality of employee tasks or competencies according to the invention. These tasks are differentiated according to job or skill family, category and level of responsibility or proficiency. In step 31 the system (or user) sets up job families, categories and levels of responsibility. In step 33, the system electronically or manually enters observed market rates for one or more job families and one or more C/L combinations, using published or available on-line salary surveys. Receipt of information relating to observed market rates allows the pertinent system parameters relating to job families, categories and levels of responsibility to be established according to the invention. This market information is manually or electronically entered into a data structure or memory, according to user selection.

In step 35, the system classifies the observed market rates into the corresponding job families and C/L combinations. The market rate information is sorted by job family, then by a combination (C/L) of category and level of responsibility. The observations for each C/L combination are grouped together, and a weighted median or average log market rate for the observations in each C/L group is determined. A matrix M with diagonal elements equal to the number of job families in each C/L combination is generated. A matrix N with diagonal entries equal to the number of C/L combinations in each job family is generated. A matrix T is generated with elements indicating the absence (0) or the presence (1) of a particular job family occurrence and a particular C/L combination. A matrix S1 is generated whose entries are the sums of median (or average) market rates for C/L combinations for particular job families. A matrix S2 is generated whose entries are the sums of median (or average) market rates for particular C/L combinations.

In step 37, the system, statistically regresses the observed job families and C/L combinations against the observed market rates to obtain at least one logarithm $x_i$ of a job family factor and at least one logarithm $y_j$ of a C/L factor. This is implemented by solving first and second linear relationships between the job family factors $x_i$ and the C/L factors $y_j$. These linear relationships are expressible in terms of the matrices M, N, T, S1 and S2 and column matrices including the entries $x_i$ and $y_j$. A job family factor $x_i$ and a C/L factor $y_j$ can be combined and transformed to provide an estimate of a market rate corresponding to a job having that job family factor and that C/L factor. In step 39, the job family factors $x_i$ and the C/L factors $y_j$ are used to compute an estimated market rate for at least one job. This job may be one for which a market rate was observed, or one for which a market rate was not observed.

The statistical regression step 37 may proceed as follows: (1) sort the data by category, by job family and by level of responsibility; (-2) combine all observations with the same job family and C/L combination, compute the median market rate for all observations in this observation group, and assign a single data point to median market rate; (3) calculate the median log(market rate) for each observation group; (4) use Eqs. (2)–(6), plus the definitions of the matrices N, M, T, S1 and S2 to obtain a solution $$Y=(I+M-T''N^{-1}T)^{-1}(S2+D-T''N^{-1}S1) \qquad (15)$$

for the log(C/L factors) and (5) obtain a solution $$X=N^{-1}(S1-TY) \qquad (16)$$

for the log(job family factors).

A computer can be programmed to perform the operations set forth in the preceding discussion. A basic set of market observations is obtained, where each market observation has a corresponding job family index (i) and C/L index (j). Optionally, a job title and/or a weight may also be associated with each market rate observation. Entries are made in a text file, having one line for each market rate observed and including the following information items for each observation:

| | |
|---|---|
| job code (optional) | integer (type) |
| job family | long integer |
| category | long integer |
| level of responsibility | integer |
| market rate | real |
| job title (optional). | string |

The number (m) of category/level of responsibility combinations used may be modest. In one embodiment of the invention, a suitable set of C/L combinations, useful in most businesses, is the following four categories, each with five or six corresponding levels of responsibility:

Support: five responsibility levels

Management: six responsibility levels

Professional: six responsibility levels

Executive: five responsibility levels

In this model, 22 C/L combinations are used. In some companies, one or more of the categories may be absent so that fewer than 22 C/L combinations may suffice for some situations. In other situations, the client company may prefer a finer cut, for example by further dividing the support category into two or more sub-categories, optionally each with its own set of levels and criteria for these different levels.

Each of the support category and the professional category has evaluation criteria expressed in terms of knowledge required (general education, vocational, undergraduate, professional, certification), complexity of assignments and judgment required, latitude in making decisions, and number of years of related experience, with each successive level within a category requiring an increasing manifestation of competence and initiative. These levels of responsibility for a given category may correspond approximately to entry-level, intermediate level, advanced, senior and lead personnel for that category, or some other set of criteria may be used to determine level of responsibility.

Each of the management category and the executive category has evaluation criteria expressed in terms of management controls and influence (development and implementation of standards, evaluation of employee and manager performance, counseling, hiring and terminating personnel, budget planning and implementation, profit & loss responsibility, making and implementation of company policy and strategy, etc.) and latitude in making decisions (long term versus shorter term objectives, initiation of new business and new product ideas, etc.).

The number of job families within an organization can be very large; a number such as 200–400 is common for most companies. A representative job family master list that may be suitable for a large high technology firm is the following:

All Job Families

Administration

Accounting and Finance

General Accounting

Accounting             Controller             Payroll         Cost Accounting         Credit Management             Credit             Credit and Collections         Finance             Auditing             Budgeting             Financial Analysis             Stock Plan Administration             Tax Accounting             Treasury         Contracts Administration             Commercial Contracts             Government Contracts     Human Resources         Employment             Employment             Technical Recruiting         Human Resources             Benefits             Compensation             Compensation and Benefits             EEO             Employee Assistance             Employee Relations             HRIS Human Resources
  Nurse
Labor Relations
  Labor Relations
Training and Development
  Training
Administration Support
  Administrative Support
    Data Entry
    General Clerical
    Librarian
    Mail Services
    Reception
    Travel
    Word Processing
  Secretarial
    Secretarial
Facilities Management
  Property Administration
    Facilities Helper
    Janitorial
  Facilities
    Facilities Engineering
    Facilities Management
    Maintenance
  Safety and Security
    Environmental Engineering
    Safety
    Safety/Security
    Security
Information Technology
  Information Technology
    Programming and Analysis
      Applications Programming
      Artificial Intelligence
      BAAN Software
      Bus Systems Analysis
      Call Center Architecture
      Database Administration
      Data Mining and Warehousing
      Decision Support Systems
      Distributive Systems
      Information Systems
      Lotus Notes
      Middleware
      Oracle Application Development
      Oracle Database Administration
      Oracle Production Services
      PeopleSoft Application Development
      PeopleSoft Production Services
      Programming Analysis
      SAP Application Development
      SAP Production Services
      Scientific Programming
      Systems Analysis
      Systems Programming
      UNIX System Administration
      Year 2000 Programming
    Computer Operations
      Computer Operations
        Computer Operations
        Data Security
        Disaster Recovery
        IT Librarian
  Multi-Media
    Multi-Media
      Computer Animation
      Data Visualization
      Digital Artistry
      Graphics Design
      Multi-Media Design
      Web Site Development
  Network Administration
    Network Administration
      E-mail Administration
      Help Deck
      LAN Administration
      Micro Computer Support
      Network Engineering
      Network Planning
      Network Systems Administration
      Network Systems Analysis
      Telecommunications
Legal
  Corporate Counsel
    Counsel
      Counsel
      Legal Assistance
      Paralegal
Production
  Manufacturing Production
    Assembly
      Assembly
      Model Making
      Package Assembly
    Inspection
      Inspection
      Quality Control
      Receiving Inspection
    Assembly
      Semi Assembly
    Pharmaceutical
      Process Operations
    Semi Fab Operations
      Chemical Mix
      Semiconductor Inspection
      Semiconductor Manufacturing
      Semi Fab Operations
      Semi Production Work
  Engineering Services
    Engineering Services
      Document Control
      Engineering Services
      Engineering Systems Administration
      ECN Analysis
  Materials and Procurement
    Procurement
      Buying
      Buying/Planning
      Purchasing
      Supplier QA Engineering
    Materials Management
      Expediting
      Inventory Control
      Logistics Planning
      Materials
      Production Control
      Production Planning
      Scheduling
      Shipping/Receiving/Stores Traffic
   Import/Export Administration
   Traffic
Product Development
  Engineering
    Development Engineering
      ASIC Design Engineering
      Development Engineering
      Electrical Design Engineering
      Hardware Development Engineering
      Head Media Engineering
      Mechanical Design Engineering
      Medical Device Engineering
      Product Research
      Quality Engineering
      Read-Write Engineering
      Reliability Engineering
      Servo Engineering
      Supplier Quality Engineering
      Systems Design
      Test Development Engineering
      Tribology Engineering
    Software Engineering
      Firmware
      Object Engineering
      Software Development Engineering
      Software Engineering: Applications
      Software Engineering: Systems
      Telecommunications Engineering
    Engineering
      CAD Engineering
      Engineering
      Failure Analysis
      Mechanical Engineering
      Product Engineering
    Project and Program Management
      Project and Program Management
      Professional Services Consulting
  Design and Drafting
    CAD Design
      CAD Design
    Design
      Design Checking
      Design Drafting
      Drafting
      Mask Design
      PC Board Design
  Chemical Engineering
    Chemistry
      Chemistry
      Research
  Process Engineering
    Semiconductor Engineering
      Package Engineering
      Process Engineering
      Sustaining Engineering
      Wafer Engineering
  Manufacturing Engineering
    QA Engineering Services
      SW QA Engineering
      QA Auditing
      QA Engineering
      QA Manufacturing
    Manufacturing Engineering
      Electronic Testing
      Line Maintenance
      Manufacturing
      Manufacturing Engineering
      Manufacturing Equipment Engineering
      Operations Engineering
      Production Testing
      Test Engineering
    Machining
      Machine Operations
      Machining
      Tool and Die
Marketing
  Marketing
    Marketing
      Business Development
      Channel; Marketing
      Market Research
      Marketing
      Marketing Support
      Product Application Engineering
      Product Marketing
  Marketing Services
    Advertising and Public Relations
      Events
      Marketing Communications
      Public Relations
    Training
      Technical/Customer Training
      Technical Course Developer
  Marketing Communications
    Marketing Communications
      Desktop Publishing
      Editing
      Publications
      Technical Illustrating
      Technical Writing
  Customer Service
    Customer Service
      Customer Service
      Order Processing
      Product Support
      Telemarketing
    Systems Engineering
      Systems Engineering Field Support
      Systems Engineering
    Technical Customer Service
      Field Applications
      Field Engineering
      Technical Support
Sales
  Sales
    Sales
      Field Sales
    Sales Support and Administration
      Sales Support
    Telesales
      Telesales If all components of this master list are included, this master list would have about 287 elements.

If this particular model is adopted, the number n of job families will be about 287 and the number of C/L combinations will be 22 so that a maximum of 6314 different job family and C/L combinations is available for estimating market rates for this hypothetical high technology company.

The basic process for developing a market-based compensation system within a client organization is the following: (1) identify the job families, categories and levels of responsibility that are important to the client's success; (2) identify the salary surveys from which market observations can be gathered and enter these observations into a database; (3) organize the market data into job families, categories and levels of responsibility; (4) through the application of the algorithm, estimate the market rate for any combination of job family and C/L; and (5) using the results from the analysis, evaluate employees and administer salaries. The preceding steps are preferably automated.

Figure 3:
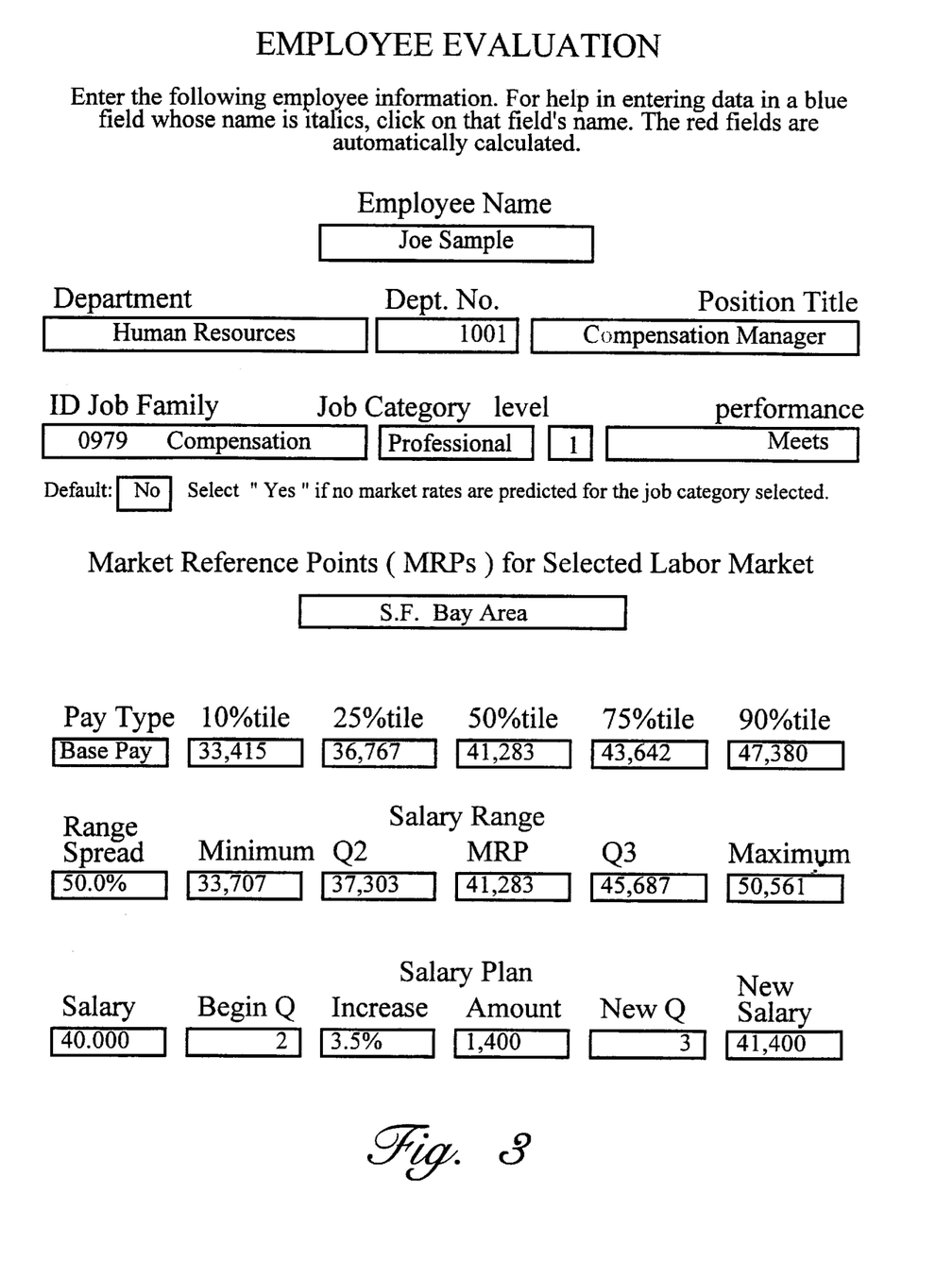
FIG. 3 illustrates a "screen" of an application used to administer salaries based on market values produced by this invention.

In one embodiment, after the analysis is completed, the results are presented for one or more named employees, or for one or more specified groups of employees, using a format that includes the information illustrated in FIG. 3. An employee name, department (optional) and job title (optional), job family, category, level of responsibility, relative performance (optional) and appropriate geographic location (optional) are displayed for the specified employee or group, as shown in FIG. 3. Pay type (base pay or total pay) is set forth, and the market value is displayed at various percentiles. The 50%ile is often taken as an estimate market value for a specified combination of job family and C/L. In turn, the 50%ile can be used as the basis for other information. For example, in FIG. 3, a salary range for this employee has been established using the 50%ile as the geometric means for a 50% range spread.

The invention can also be used to compute and recommend appropriate salary increases. For example, salary increase guidelines that take into consideration rating and salary in relationship to the employee's market value can be established and applied to employees classified in the above manner. In FIG. 3, for example, Joe Sample, who has a performance rating of "Meets" and a salary that falls within the second quartile of a 50% salary range, would be qualified for a 3.5% salary increase. Changing the subject's classification (job family, category, or level), his performance rating, or salary will result in a different increase. If the employee's performance is below standard and the employee's salary is substantially above the employee's market value, the system might recommend an annual increase that is much smaller.

Figure 4:
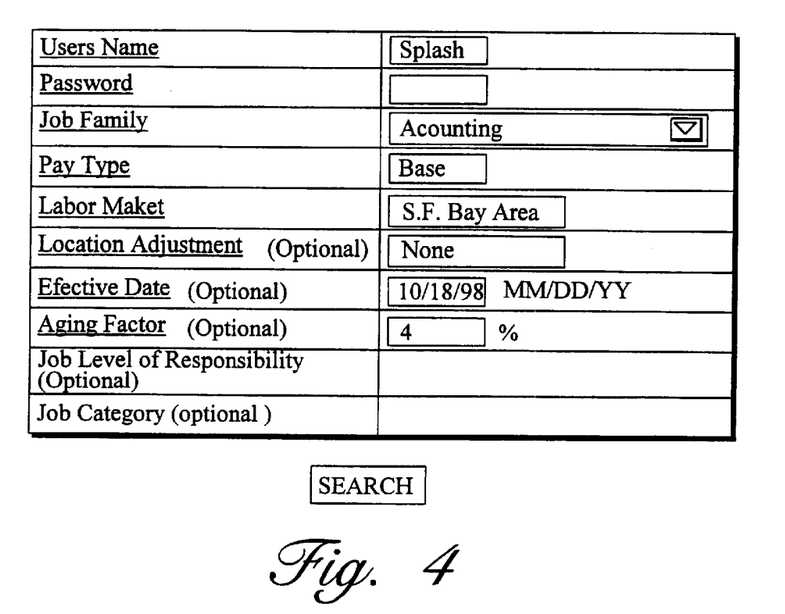
FIGS. 4 and 5 illustrate an application in which market values for a selected job family are displayed over the Internet.

The invention is also configured for use with a suitable search engine on the Internet. FIG. 4 illustrates an information entry screen that is suitable for providing data for, and initiating, a search for relevant market values that have been processed using the invention. Optionally, the user-subscriber of this application can be required to enter the user name here (here, "Splash") and a subscriber password. With reference to FIG. 4, the user also specifies a job family (here, the general family of accounting), pat type, (here, base pay), the relevant labor market, a location adjustment factor (optional), an effective date for the survey data and analysis (optional), and an aging factor (optional).

Figure 5A:
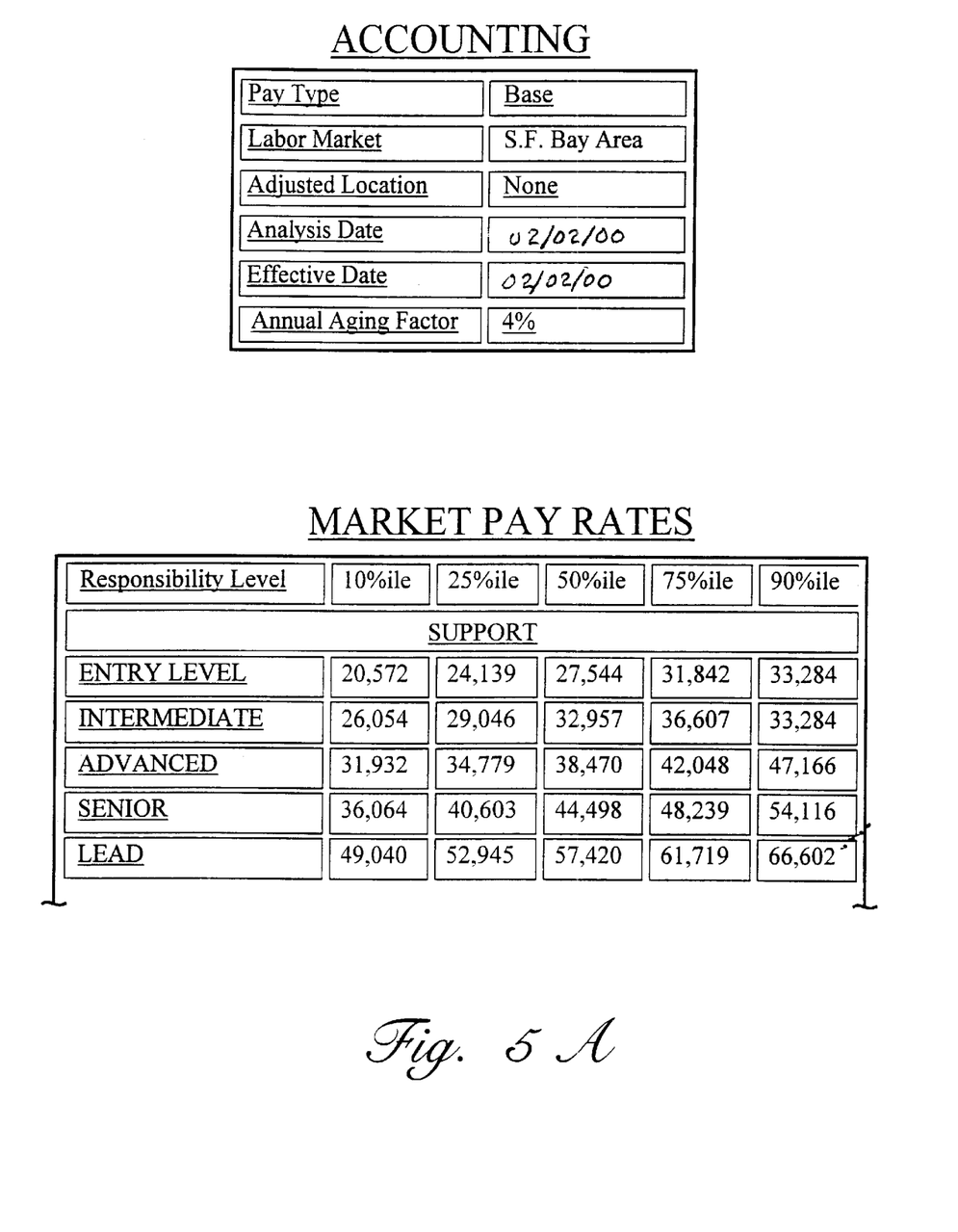
Figure 5B:
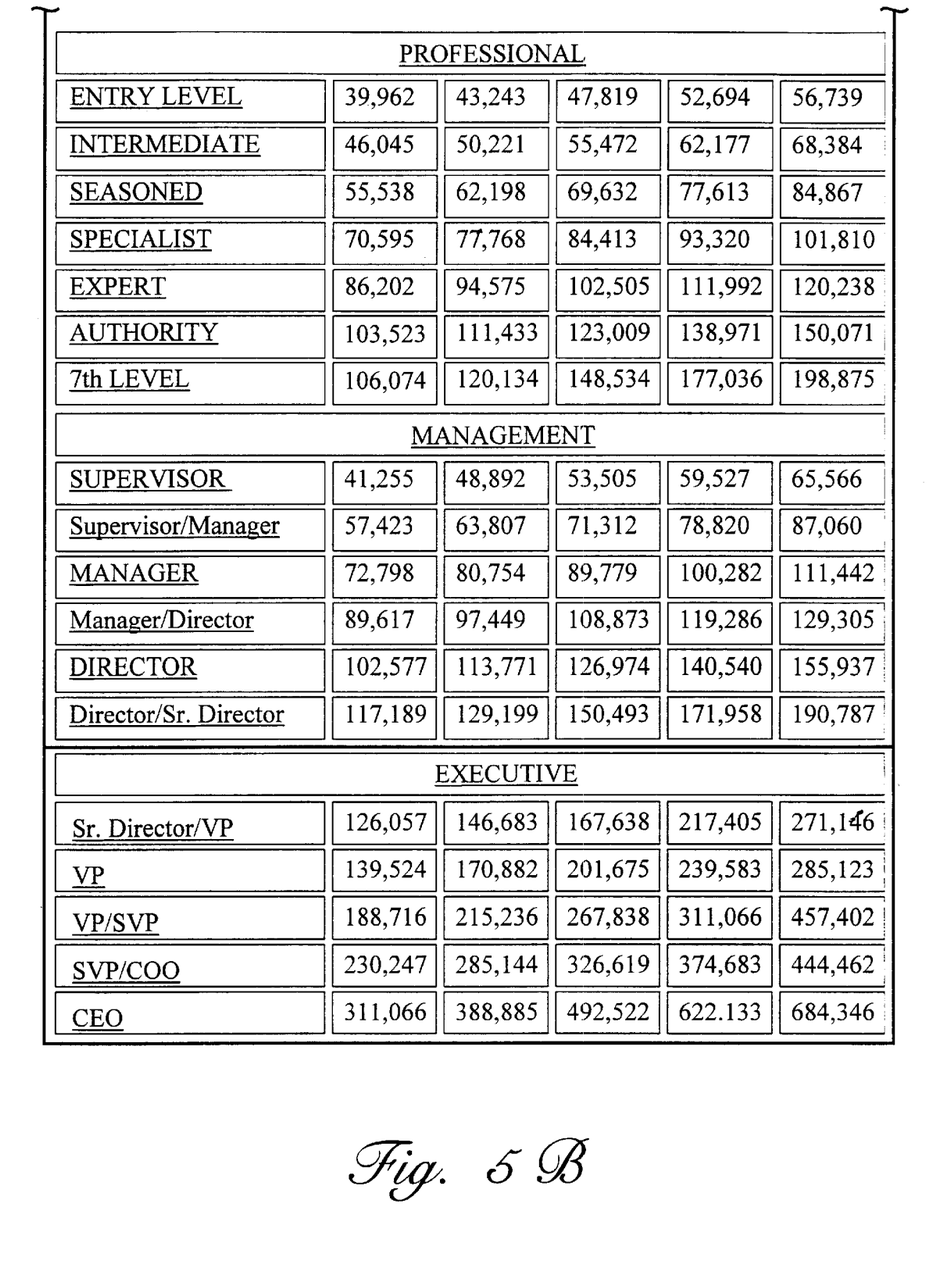

FIG. 5 illustrates a suitable printout of information that the system provides in response to the search request entered on the screen of FIG. 4. The system first restates the job family, the pay type, the labor market, a location adjustment, an effective date and aging. The screen displays the estimated market rates for 10%ile, 25%ile, 75%ile and 90%ile for each level of responsibility in three categories (support, professional and management).

The invention has three parts. The first part is a method for breaking down a set of observations (market rates) into job families, categories and levels of responsibility. The second part is the algorithm, discussed in the preceding, to mathematically analyze the entered observations and to produce one or more factors for the job families and one or more factors for the category/levels included in the model. The third part is the deployment of the factors in other applications for the purpose of communicating market values and/or administering salaries.

An appendix provides some additional useful information on practice of this invention.

APPENDIX

Dictionary of Terms

Market Value: The product of multiplying the job family factor by the category/level factor. The estimated market rate for any combination of job family and level of responsibility within a specified labor market.

Job Family Factor: The coefficient of the independent variable job family. The estimated rank market value of the job family.

C/L Factor: The coefficient of the independent variable category/level of responsibility. The estimated market value of the category and level of responsibility.

Market Rates: The raw observations or the dependent variable used in calculating of market values. Market rates may be expressed as individual salaries or the aggregate of individual salaries (means, medians, and percentiles) for different pay types such as base pay or total pay.

Market-based Compensation System: Within the context of this application a set of procedures for systematically determining the market value of any combination of job family and level of responsibility within a specified labor market and applying these results to the administration of salaries within an organization.

Job Family: One of the two independent variables used in determining an employee's market value. A cluster of duties associated with a particular area of specialization. These duties are described without reference to any particular level of responsibility.

Category/Level of Responsibility (C/L): One of the two independent variables used in determining an employee's market value. C/Ls apply to all employees regardless of differences in assigned job families.

Category: A division within the levels of responsibility. Four categories are usually sufficient to describe the levels of responsibility in most organizations. The four categories are support, professional, management, and executive.

Labor Market: The companies from which a client organization may attract or lose employees. Labor markets may be characterized by geography, industry, and/or size of company.

Band: In the context of this application, job families may be rolled up into broader and broader definition. Each iteration is referred to as a band. Estimated market values are produced for job families at each band level. The application incorporates five bands.

Observation: In the context of this application, this term is used interchangeably with market rate, which is the dependent variable in our model.

Enhanced Model for Market-Based Compensation System

For any given set of observations let the job family be indexed by I ranging from 1 to n. Define the rank of a position as the category and level and let the ranks from the set of observations be indexed by j ranging form 1 to m:

Job family: $i = 1, \ldots n$

Rank=category+level: $j = 1, \ldots, m$.

We reduce the set of observations to a set of "median observations" or "data points" as follows. We will refer to all observations for a single job family I and rank j as a "data point." The "salary" corresponding to this data point is the median salary of all observations for job family I and rank j. Also, a "salary" is the log of a real salary.

Assuming there are p data points we construct two matrices J and R. J and R have as many rows as data points, J has one column for each job family and R has one column for each rank. Thus the dimensions of J are p by n and the dimension of R are p by m. For each data point, the corresponding row of matrix J contains a 1 in the column for the job family and zeros elsewhere and the corresponding row of matrix R contains a 1 in the column for the rank and zeros elsewhere. Thus $J_{ki}=1$ iff job I is observed in data point k, otherwise $J_{ki}=0$ $R_{kj}=1$ iff rank j is observed in data point k, otherwise $R_{kj}=0$ K=1, . . . , p, $1 \leq i \leq n$, $1 \leq j \leq m$.

We also construct a column vector S containing the salaries (one for each data point). The main problem consists of finding columns of logarithmic job family factors $X=(x_1, \ldots, x_n)^t$ and logarithmic rank factors $Y=(y_1, \ldots, y_m)^t$ which satisfy:

$$[J \quad R]\begin{bmatrix} X \\ Y \end{bmatrix} \approx [S]$$

As we know, solving this system in terms of least squares leads to ambiguities. For example, a constant could be added to every $x_i$ and subtracted from every $y_j$ and the resulting solution would be just as good. Moreover, if the given data lies in "disconnected" subsets, even more degrees of freedom are introduced into the least-squares solution. The way to eliminate the indeterminacy in the problem is to add some more conditions. Not only should each salary be predicted by the sum of its job family factor and rank factor, but salaries should be roughly predicted by rank factors alone. That is, if D is a column matrix with one entry for each rank, and if $D_j$ is the average salary or the median salary for rank j, then we have a new system to solve (in the sense of least squares):

$$\begin{bmatrix} J & R \\ 0 & I \end{bmatrix}\begin{bmatrix} X \\ Y \end{bmatrix} \approx \begin{bmatrix} S \\ D \end{bmatrix}$$

We now proceed to reduce the above system to a non-singular linear system. First we pre-multiply the above equation by the transpose of the coefficient matrix. We obtain the system $$\begin{bmatrix} N & T \\ T^t & M+1 \end{bmatrix}\begin{bmatrix} X \\ Y \end{bmatrix} = \begin{bmatrix} S1 \\ S2+D \end{bmatrix} \quad [1]$$

Where $N=J^t J$, $M=R^t R$, $T=J^t R$, $S1=J^t S$, $S2=R^t S$. The matrices M, N, T, S1, and S2 can be described more naturally as follows:

$$N_{ij} = \sum_k J_{kj}J_{kj} = 0 \text{ for } i \neq j,$$

since each data point has only one job family. Thus $$N = \text{diag } N_s = \sum_k J_M^3$$

is the number of different ranks observed for job family i.

$$M_{ij} = \sum_k R_{ki}R_{kj} = 0 \text{ for } i \neq j,$$

since each data point has only one rank. Thus $$M = \text{diag } M_n = \sum_k R_M^3$$

is the number of different job families observed for rank j.

$T_{ij}=1$ iff job family i and rank j are observed together; otherwise $T_{ij}=0$.

We also note that the diagonal elements of N are the row sums of T, and the diagonal elements of M are the column sums of T.

$$S1_i = \sum_k J_{kj}S_k$$

is the sum of salaries observed for job family i, and $$S2_j = \sum_k R_{kj}S_k$$

is the sum of salaries observed for rank j.

We can being to row—reduce system [1] by pre multiplying it by $$\begin{bmatrix} I & 0 \\ -T^t N^{-1} & I \end{bmatrix};$$

the resulting system takes the form:

$$\begin{bmatrix} N & T \\ 0 & M+I-T^t N^{-1}T \end{bmatrix}\begin{bmatrix} X \\ Y \end{bmatrix} = \begin{bmatrix} S1 \\ S2+D-T^t N^{-1}S1 \end{bmatrix}$$

Since N is a diagonal matrix its inverse is easy to find. The only real computational work one confronts is that of solving the non-singular system:

$$[M_+ + I - T^t N^{-1}T]Y = S2 + D - T^t N^{-1}S1$$

But the size of this square system is only the number of different ranks. Then the much larger vector X can be found by back substitution, since N is diagonal. Once the factors $X=(x_1, \ldots, x_n)$ and $Y=(y_1, \ldots, y_m)$ are found, they are most conveniently reported as multiplicative factors.

That is, we will report job family factors $JobFactor_i=e^{x_i}$ for each job family i and rank factors $RankSalary_j=e^{y_j}$ for each rank j.

Then the MRP salary for job family I and rank j is $JobFactor_i \times RankSalary_j$; if the job family is unknown or not previously in the database, then the MRP salary for the new job (at previously defined rank j) is just RankSalary.

Set up system parameters: job families, categories, and levels of responsibility.
From published and/or on-line salary surveys, electronically or manually enter observed market rates.
Classify the observed market rates into job families, categories, and levels of responsibility.
Regress job families and categories/levels of responsibility against observed market rates thereby producing a factor
for each job family and category/level of responsibility entered in the model.
    Sort data by category, then by job family, then by level. Combine all observations with the same
    category, job family and level, and assign this single data point the weighted median log market rate of
    all observations in the group.
    While data are read, calculate median log market rate for all observations with the same category and
    level.
    Read the sorted data and compute the matrices M, N, T, S1, S2.
        M is a diagonal matrix with diagonal elements equal to the number of categories/levels in each
        job family
        N is a diagonal matrix with diagonal elements equal to the number of job families in each
        category/level
        $T_0 = 1$ if job family i occurs with category/level j, else 0
        $S1_i$ = sum of median market rates at all categories/levels for job family i
        $S2_j$ = sum of median market rates for all job families with category/level
    Solve the system $Y = (I + M - T^T N^{-1} T)^{-1} (S2 + D - T^T N^{-1} T S1)$. Y contains the log
    category/level factors.
    Solve the system $X = N^{-1}(S1 - TY)$. X contains the log job family factors.
Use job family factors and C/L factors to calculate market values displayed over the internet or an organization's
intranet (see attached example).

What is claimed is:

1. A method for estimating a market rate for tasks or competencies that are differentiated by job family or skill family, by category, and by level of responsibility or proficiency level, the method comprising providing a computer that is programmed:

to provide a logarithm $s_k$ of an observed market rate, numbered k=1, 2, . . . , K, for each of a set of selected jobs, where each of the selected jobs has an associated job category and job level of responsibility, collectively referred to as a C/L combination, and has an associated job family;

to provide a selected statistical average $d_h$, numbered h=1, . . . , m, of the observed market rate logarithms for each of the C/L combinations;

to assign to each of the selected jobs a logarithm $x_i$ corresponding to a job family, numbered i=1, 2, . . . , n ($n \geq 2$), and a logarithm $y_j$ corresponding to a C/L combination, numbered j=1, 2, . . . , m ($m \geq 2$), where the values of the quantities $x_i$ and $y_j$ are to be determined;

to form a first (m+n)-row column matrix $[X\ Y]^{tr}$, whose entries are the logarithms $x_i$ and the logarithms $y_j$, and a second (K+m)-row column matrix $[S\ D]^{tr}$, whose entries are the observed market rate logarithms $s_k$ and m selected statistical averages $d_h$ of the observed market rate logarithms; to construct a set of matrix relations $$\begin{vmatrix} J & R \\ O & I \end{vmatrix} \begin{vmatrix} X \\ Y \end{vmatrix} = \begin{vmatrix} S \\ D \end{vmatrix}$$

relating the values $x_i$ and $y_j$ to the values $s_k$ and $d_h$, where J is a p×n matrix having one column, corresponding to each job family with at least one available observed market rate, and each column in J has an entry 1 for the corresponding job family and 0 entries elsewhere, where R is a p×m matrix having one column, corresponding to each C/L combination with at least one available observed market rate, and each column in R has an entry 1 for the corresponding C/L combination and 0 entries elsewhere, and where "O" is a q×m matrix of 0 entries and "I" is an m×m identity matrix; and to estimate solution values $x_i$ and $y_j$ for the set of matrix relations and forming a product of $\exp(x_i)$ and $\exp(y_j)$ to obtain a job family factor and a C/L factor for at least one of the observed market rates.

2. The method of claim 1, further comprising the step of presenting in a visually perceptible form, for at least one chosen job: (i) a job family associated with the at least one chosen job, (ii) an estimated market rate, computed using said estimated solution values $x_i$ and $y_j$ that correspond to the at least one chosen job family.

3. The method of claim 1, further comprising the step of programming said computer to receive, for at least one chosen job family, at least one of the following: (i) a specification of a level of responsibility of a worker who performs a job in the chosen job family and (ii) a specification of a geographic region in which the worker's job in the chosen job family is performed.

4. The method of claim 1, further comprising the step of choosing said C/L combination from a group of four C/L combinations consisting of support, professional, management, and executive.

5. The method of claim 1, further comprising the step of choosing said job level of responsibility for said at least one job of said selected set of jobs from a group of job levels of responsibility associated with said C/L combination for said at least one job, where the group of job levels of responsibility includes between two and nine levels of responsibility.

6. The method of claim 1, further comprising programming said computer to estimate solution values $x_i$ and $y_j$ for said matrix relation set by a process comprising:

forming a second set of matrix relations $$\begin{vmatrix} N & T \\ O & I + M - T^{tr}N^{-1}T \end{vmatrix} \begin{vmatrix} X \\ Y \end{vmatrix} = \begin{vmatrix} J^{tr}S \\ R^{tr}S + D - T^{tr}N^{-1}J^{tr}S \end{vmatrix}$$

where $N = J^{tr}J$, $T = J^{tr}R$ and $M = R^{tr}R$;

solving the second matrix relation set for the matrix Y of said entries $y_j$; and solving the second matrix relation set for the matrix X of said entries $x_i$.

7. The method of claim 1, further comprising programming said computer to obtain an estimate of market rate value for a selected job, having a combination of an associated job family and an associated C/L combination that is not represented by a market rate in said set of selected jobs, by a process comprising:

obtaining said estimated job family factor, $x_i=x'_i$, for a first job having a job family corresponding to the associated job family;

obtaining said estimated C/L factor, $y_j=y'_j$, for a second job having a C/L combination corresponding to the associated C/L combination, where the first job and the second job are different from each other; and multiplying the values $\exp(x'_i)$ and $\exp(y'_j)$ to obtain an estim.

8. The method of claim 1, further comprising programming said computer to obtain an estimate of market rate value for a selected job, having a combination of an associated job family and an associated C/L combination that is represented by a market rate in said set of selected jobs, by a process comprising:

obtaining said estimated job family factor, $x_i=x'_i$, for a first job having a job family factor corresponding to the selected job family factor;

obtaining said estimated C/L factor, $y_j=y'_j$, for a second job having a C/L factor corresponding to the selected C/L factor, where the first job and the second job are the same; and multiplying the values $\exp(x'_i)$ and $\exp(y'_j)$ to obtain an estimate of market rate value for the selected job.

9. A system for estimating a market rate for tasks or competencies that are differentiated by job family or skill family, by category, and by level of responsibility or proficiency level, the system comprising:

a source for market rate observations for each of a set of selected jobs;

a computer that is programmed:

to receive a logarithm $s_k$ of an observed market rate, numbered k=1, 2, . . . , for each of a selected set of jobs, where each of the selected set of jobs has an associated job category and job level of responsibility, collectively referred to as a C/L combination, and has an associated job family;

to provide a selected statistical average $d_h$, numbered h=1, . . . , m, of the observed market rate logarithms for each of the C/L combinations;

to assign to each of the selected jobs a logarithm $x_i$ of a job family, numbered i=1, 2, . . . , n (n≧2), and a logarithm $y_j$ of a C/L combination, numbered j=1, 2, . . . , m (m≧2), where the values of the quantities $x_i$ and $y_j$ are to be determined;

to form a first (m+n)-row column matrix $[X^{tr}\ Y^{tr}]^{tr}$, whose entries are the logarithms $x_i$ and the logarithms $y_j$, and a second (K+m)-row column matrix $[S^{tr}\ D^{tr}]^{tr}$, whose entries are the observed market rate logarithms $s_k$ and m selected statistical averages $d_h$ of the observed market rate logarithms;

to construct a set of matrix relations $$\begin{vmatrix} J & R \\ O & I \end{vmatrix} \begin{vmatrix} X \\ Y \end{vmatrix} = \begin{vmatrix} S \\ D \end{vmatrix}$$

relating the values $x_i$ and $y_j$ to the values $s_k$ and $d_h$, where J is a p×n matrix having one column corresponding to each job family with at least one available observed market rate and each column in J has an entry 1 for the corresponding job family and 0 entries elsewhere, where R is a p×m matrix having one column corresponding to each C/L combination with at least one available observed market rate and each column in R has an entry 1 for the corresponding C/L combination and 0 entries elsewhere, and where "O" is a q×m matrix of 0 entries and "I" is an m×m identity matrix; and to estimate solution values $x_i$ and $y_j$ for the set of matrix relations and to form a product of $\exp(x_i)$ and $\exp(y_j)$ to obtain a job family factor and a C/L factor for at least one of the observed market rates.

10. The system of claim 9, wherein said computer is further programmed:

to present in a visually perceptible form, for at least one chosen job: (i) a job family associated with the at least one chosen job, (ii) an estimated market rate computed using said estimated solution values $x_i$ and $y_j$ that correspond to the at least one chosen job.

11. The system of claim 9, wherein said computer is further programmed:

to receive, for at least one chosen job family, at least one of the following: (i) a specification of a level of responsibility of a worker who performs a job in the chosen job family and (ii) a specification of a geographic region in which the worker's job in the chosen job family is performed.

12. The system of claim 9, wherein said computer is further programmed to choose said C/L combination from a group of four C/L combinations consisting of: support, professional, management, and executive.

13. The system of claim 9, wherein said computer is further programmed to choose said job level of responsibility for said at least one job of said set of selected jobs from a group of job levels of responsibility associated with said job category for said at least one job, where the group of job levels of responsibility includes between two and nine levels of responsibility.

14. The system of claim 9, wherein said computer is further programmed to estimate solution values $x_i$ and $y_j$ for said matrix relation set by a process comprising:

forming a second set of matrix relations $$\begin{vmatrix} N & T \\ O & I+M-T^{tr}N^{-1}T \end{vmatrix} \begin{vmatrix} X \\ Y \end{vmatrix} = \begin{vmatrix} J^{tr}S \\ R^{tr}S+D-T^{tr}N^{-1}J^{tr}S \end{vmatrix}$$

solving the second matrix relation set for the matrix Y of said entries $y_j$; and solving the second matrix relation set for the matrix X of said entries $x_i$.

15. The system of claim 9, wherein said computer is further programmed to obtain an estimate of market rate value for a selected job, having a combination of an associated job family and an associated C/L combination that is not represented by a market rate in said set of selected jobs, by a process comprising:

obtaining said estimated job family factor, $x_i=x'_i$, for a first job having a job family corresponding to the selected job family;

obtaining said estimated C/L factor, $y_j=y'_j$, for a second job having a C/L combination corresponding to the selected C/L combination, where the first job and the second job are different from each other; and multiplying the values $\exp(x'_i)$ and $\exp(y'_j)$ to obtain an estimate of market rate value for the selected job.

16. The system of claim 9, wherein said computer is further programmed to obtain an estimate of market rate value for a selected job, having a combination of an associated job family and an associated C/L combination that is represented by a market rate in said set of selected jobs, by a process comprising:

obtaining said estimated job family factor, $x_i = x'_i$, for a first job having a job family factor corresponding to the selected job family factor;

obtaining said estimated C/L factor, $y_j = y'_j$, for a second job having a C/L factor corresponding to the selected C/L factor, where the first job and the second job are the same; and     multiplying the values $\exp(x'_i)$ and $\exp(y'_j)$ to obtain an estimate of market rate value for the selected job.

\* \* \* \* \*